(12) United States Patent
Cheung et al.

(10) Patent No.: US 9,134,710 B2
(45) Date of Patent: *Sep. 15, 2015

(54) SYSTEM AND METHOD FOR USING RAMPED SETPOINT TEMPERATURE VARIATION WITH NETWORKED THERMOSTATS TO IMPROVE EFFICIENCY

(75) Inventors: Leo Cheung, Sunnyvale, CA (US); Scott Douglas Hublou, Redwood City, CA (US); John Douglas Steinberg, Millbrae, CA (US)

(73) Assignee: EcoFactor, Inc., Millbrae, CA (US)

( * ) Notice: Subject to any disclaimer, the term of this patent is extended or adjusted under 35 U.S.C. 154(b) by 900 days.

This patent is subject to a terminal disclaimer.

(21) Appl. No.: 13/219,381

(22) Filed: Aug. 26, 2011

(65) Prior Publication Data

US 2011/0307103 A1 Dec. 15, 2011

Related U.S. Application Data

(63) Continuation of application No. 12/498,142, filed on Jul. 6, 2009, now Pat. No. 8,010,237.

(60) Provisional application No. 61/133,994, filed on Jul. 7, 2008.

(51) Int. Cl.
*G05B 21/00* (2006.01)
*G05B 13/00* (2006.01)
(Continued)

(52) U.S. Cl.
CPC ..... *G05B 13/0245* (2013.01); *F24F 2011/0013* (2013.01); *F24F 2011/0058* (2013.01); *F24F 2011/0075* (2013.01); *G05B 2219/23399* (2013.01); *G05B 2219/2614* (2013.01)

(58) Field of Classification Search
CPC ............... H04L 12/2818; H04L 67/125; F24F 2011/0068; G05D 23/1904; G05D 23/1931
USPC .............. 236/1 R, 46 R, 46 C, 47, 49.1, 49.3; 700/9, 11, 275, 276, 278, 299, 300, 700/306; 340/500, 5.1, 539.1, 825.22, 501; 165/200, 201, 216, 238, 239, 253, 267, 165/287; 702/182
See application file for complete search history.

(56) References Cited

U.S. PATENT DOCUMENTS 4,136,732 A 1/1979 Demaray et al.
4,341,345 A * 7/1982 Hammer et al. ............ 236/46 R
(Continued)

FOREIGN PATENT DOCUMENTS

EP 0415747 A2 3/1991
JP 05-189659 7/1993
(Continued)

OTHER PUBLICATIONS
U.S. Appl. No. 13/470,074, filed Aug. 30, 2012, Steinberg.
(Continued)

*Primary Examiner* — Crystal J Barnes-Bullock
(74) *Attorney, Agent, or Firm* — Knobbe, Martens, Olson & Bear, LLP

(57) ABSTRACT

The invention comprises systems and methods for ramping setpoints on thermostats controlling HVAC systems. At least one thermostat is located inside a structure and is used to control an HVAC system in the structure. At least one remote processor is in communication with said thermostat and at least one database stores data reported by the thermostat. At least one processor compares the outside temperature at least one location and at least one point in time to information reported to the remote processor from the thermostat. The remote processor ramps the setpoint on the thermostat so as to reduce the average spread between inside temperature and outside temperature in order to reduce energy consumption with affecting comfort. The remote processor takes into account the effect of weather conditions and occupant preferences in determining whether and when to ramp setpoints.

17 Claims, 9 Drawing Sheets

(51) Int. Cl.
*G05B 15/00* (2006.01)
*G05D 23/00* (2006.01)
*H01H 43/00* (2006.01)
*F24F 7/00* (2006.01)
*F24F 3/00* (2006.01)
*F28F 13/00* (2006.01)
*G05B 13/02* (2006.01)
*F24F 11/00* (2006.01)

(56) References Cited

U.S. PATENT DOCUMENTS

| | | |
|---|---|---|
| 4,403,644 A | 9/1983 | Hebert |
| 4,475,685 A | 10/1984 | Grimado et al. |
| 4,655,279 A | 4/1987 | Harmon |
| 4,674,027 A | 6/1987 | Beckey |
| 5,124,502 A * | 6/1992 | Nelson et al. ............... 556/478 |
| 5,244,146 A | 9/1993 | Jefferson et al. |
| 5,270,952 A | 12/1993 | Adams et al. |
| 5,314,004 A | 5/1994 | Strand et al. |
| 5,462,225 A | 10/1995 | Massara et al. |
| 5,544,036 A | 8/1996 | Brown et al. |
| 5,555,927 A | 9/1996 | Shah |
| 5,572,438 A | 11/1996 | Ehlers et al. |
| 5,682,949 A | 11/1997 | Ratcliffe et al. |
| 5,717,609 A | 2/1998 | Packa et al. |
| 5,725,148 A * | 3/1998 | Hartman ...................... 236/49.3 |
| 5,729,474 A | 3/1998 | Hildebrand et al. |
| 5,818,347 A | 10/1998 | Dolan et al. |
| 5,977,964 A | 11/1999 | Williams et al. |
| 6,079,626 A * | 6/2000 | Hartman ........................ 236/13 |
| 6,115,713 A | 9/2000 | Pascucci et al. |
| 6,145,751 A | 11/2000 | Ahmed |
| 6,178,362 B1 | 1/2001 | Woolard et al. |
| 6,241,156 B1 | 6/2001 | Kline et al. |
| 6,260,765 B1 | 7/2001 | Natale et al. |
| 6,351,693 B1 | 2/2002 | Monie |
| 6,400,956 B1 | 6/2002 | Richton |
| 6,400,996 B1 | 6/2002 | Hoffberg et al. |
| 6,437,692 B1 | 8/2002 | Petite et al. |
| 6,478,233 B1 * | 11/2002 | Shah ........................... 236/46 R |
| 6,480,803 B1 | 11/2002 | Pierret et al. |
| 6,483,906 B1 | 11/2002 | Lggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson |
| 6,594,825 B1 | 7/2003 | Goldschmidtlki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,644,098 B2 * | 11/2003 | Cardinale et al. ............ 73/25.01 |
| 6,671,586 B2 | 12/2003 | Davis et al. |
| 6,695,218 B2 | 2/2004 | Fleckenstein |
| 6,700,224 B2 | 3/2004 | Biskup, Sr. |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 | 8/2004 | Smith |
| 6,785,630 B2 | 8/2004 | Kolk |
| 6,786,421 B2 | 9/2004 | Rosen |
| 6,789,739 B2 | 9/2004 | Rosen |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,891,838 B1 | 5/2005 | Petite et al. |
| 6,912,429 B1 | 6/2005 | Bilger |
| 6,991,029 B2 | 1/2006 | Orfield et al. |
| 7,009,493 B2 | 3/2006 | Howard |
| 7,031,880 B1 | 4/2006 | Seem et al. |
| 7,039,532 B2 | 5/2006 | Hunter |
| 7,061,393 B2 | 6/2006 | Buckingham et al. |
| 7,089,088 B2 | 8/2006 | Terry et al. |
| 7,130,719 B2 | 10/2006 | Ehlers et al. |
| 7,130,832 B2 | 10/2006 | Bannai et al. |
| H2176 H | 12/2006 | Meyer et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B1 | 6/2007 | Rosen |
| 7,242,988 B1 | 7/2007 | Hoffberg et al. |
| 7,260,823 B2 | 8/2007 | Schlack et al. |
| 7,356,384 B2 | 4/2008 | Gull et al. |
| 7,476,020 B2 * | 1/2009 | Zufferey et al. ............... 374/134 |
| 7,483,964 B1 | 1/2009 | Jackson et al. |
| 7,644,869 B2 * | 1/2010 | Hoglund et al. ............. 236/49.1 |
| 7,702,424 B2 * | 4/2010 | Cannon et al. ................ 700/295 |
| 7,758,729 B1 * | 7/2010 | DeWhitt ......................... 202/87 |
| 7,784,704 B2 | 8/2010 | Harter |
| 7,848,900 B2 | 12/2010 | Steinberg et al. |
| 7,869,904 B2 * | 1/2011 | Cannon et al. ................ 700/295 |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 8,010,237 B2 | 8/2011 | Cheung et al. |
| 8,019,567 B2 | 9/2011 | Steinberg et al. |
| D646,990 S | 10/2011 | Rhodes |
| 8,090,477 B1 | 1/2012 | Steinberg |
| 8,131,497 B2 | 3/2012 | Steinberg et al. |
| 8,131,506 B2 | 3/2012 | Steinberg et al. |
| D659,560 S | 5/2012 | Rhodes |
| 8,180,492 B2 | 5/2012 | Steinberg |
| 8,340,826 B2 | 12/2012 | Steinberg et al. |
| D673,467 S | 1/2013 | Lee et al. |
| 8,412,488 B2 | 4/2013 | Steinberg et al. |
| 8,423,322 B2 | 4/2013 | Steinberg et al. |
| 8,457,797 B2 | 6/2013 | Imes et al. |
| 8,498,753 B2 | 7/2013 | Steinberg et al. |
| 8,556,188 B2 | 10/2013 | Steinberg |
| 8,596,550 B2 | 12/2013 | Steinberg et al. |
| 8,712,590 B2 | 4/2014 | Steinberg |
| D705,095 S | 5/2014 | Steinberg et al. |
| 8,738,327 B2 | 5/2014 | Steinberg et al. |
| 8,740,100 B2 | 6/2014 | Steinberg |
| 8,751,186 B2 | 6/2014 | Steinberg et al. |
| 8,840,033 B2 | 9/2014 | Steinberg |
| 8,850,348 B2 | 9/2014 | Fadell et al. |
| 8,886,488 B2 | 11/2014 | Steinberg et al. |
| 2003/0040934 A1 | 2/2003 | Skidmore et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2007/0043477 A1 | 2/2007 | Ehlers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0198549 A1 | 8/2008 | Rasmussen et al. |
| 2008/0281472 A1 | 11/2008 | Podgorny et al. |
| 2009/0052859 A1 | 2/2009 | Greenberger et al. |
| 2009/0099699 A1 | 4/2009 | Steinberg et al. |
| 2009/0125151 A1 | 5/2009 | Steinberg et al. |
| 2009/0240381 A1 | 9/2009 | Lane |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |

(56) References Cited

U.S. PATENT DOCUMENTS

| | | |
|---|---|---|
| 2010/0162285 A1 | 6/2010 | Cohen et al. |
| 2010/0211224 A1 | 8/2010 | Keeling et al. |
| 2010/0235004 A1 | 9/2010 | Thind |
| 2010/0289643 A1 | 11/2010 | Trundle et al. |
| 2010/0318227 A1 | 12/2010 | Steinberg et al. |
| 2011/0031323 A1 | 2/2011 | Nold et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0253796 A1 | 10/2011 | Posa et al. |
| 2011/0290893 A1 | 12/2011 | Steinberg |
| 2011/0307101 A1 | 12/2011 | Imes et al. |
| 2012/0023225 A1 | 1/2012 | Imes et al. |
| 2012/0046859 A1 | 2/2012 | Imes et al. |
| 2012/0064923 A1 | 3/2012 | Imes et al. |
| 2012/0065935 A1 | 3/2012 | Steinberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0135759 A1 | 5/2012 | Imes et al. |
| 2012/0158350 A1 | 6/2012 | Steinberg et al. |
| 2012/0215725 A1 | 8/2012 | Imes et al. |
| 2012/0221151 A1 | 8/2012 | Steinberg |
| 2012/0221718 A1 | 8/2012 | Imes et al. |
| 2012/0252430 A1 | 10/2012 | Imes et al. |
| 2012/0324119 A1 | 12/2012 | Imes et al. |
| 2013/0053054 A1 | 2/2013 | Lovitt et al. |
| 2013/0054758 A1 | 2/2013 | Imes et al. |
| 2013/0054863 A1 | 2/2013 | Imes et al. |
| 2013/0060387 A1 | 3/2013 | Imes et al. |
| 2013/0144453 A1 | 6/2013 | Subbloie |
| 2013/0167035 A1 | 6/2013 | Imes et al. |
| 2013/0173064 A1 | 7/2013 | Fadell et al. |
| 2013/0226502 A1 | 8/2013 | Steinberg et al. |
| 2013/0310989 A1 | 11/2013 | Steinberg et al. |
| 2013/0338837 A1 | 12/2013 | Hublou et al. |
| 2014/0039690 A1 | 2/2014 | Steinberg |
| 2014/0188290 A1 | 7/2014 | Steinberg et al. |
| 2014/0229018 A1 | 8/2014 | Steinberg |
| 2014/0316581 A1 | 10/2014 | Fadell et al. |
| 2015/0021405 A1 | 1/2015 | Steinberg |
| 2015/0025691 A1 | 1/2015 | Fadell et al. |
| 2015/0043615 A1 | 2/2015 | Steinberg et al. |

FOREIGN PATENT DOCUMENTS

| | | |
|---|---|---|
| JP | 2010-038377 | 2/2010 |
| JP | 2010-286218 | 12/2010 |
| KR | 10-1994-0011902 | 6/1994 |
| KR | 10-1999-0070368 | 9/1999 |
| KR | 10-2000-0059532 | 10/2000 |
| WO | WO 2011/149600 | 12/2011 |
| WO | WO 2012/024534 | 2/2012 |
| WO | WO 2013/187996 | 12/2013 |

OTHER PUBLICATIONS

U.S. Appl. No. 13/523,697, filed Jun. 14, 2012, Hublou et al.
U.S. Appl. No. 13/725,447, filed Jun. 6, 2013, Steinberg.
U.S. Appl. No. 13/852,577, filed Mar. 28, 2013, Steinberg et al.
U.S. Appl. No. 13/858,710, filed Sep. 5, 2013, Steinberg et al.
U.S. Appl. No. 13/861,189, filed Apr. 11, 2013, Steinberg et al.
U.S. Appl. No. 14/082,675, filed Nov. 18, 2003, Steinberg et al.
U.S. Appl. No. 14/285,384, filed May 22, 2014, Steinberg et al.
U.S. Appl. No. 14/292,377, filed May 30, 2014, Steinberg.
U.S. Appl. No. 14/491,554, filed Sep. 19, 2014, Steinberg.
U.S. Appl. No. 14/527,433, filed Oct. 29, 2014, Steinberg et al.
Arens, et al, "How Ambient Intelligence Will Improve Habitability and Energy Efficiency in Buildings", 2005, research paper, Center for the Built Environment, Controls and Information Technology.
Comverge SuperStat Flyer, prior to Jun. 28, 2007.
Control4 Wireless Thermostat Brochure, 2006.
Cooper Power Systems Web Page, 2000-2009.
Enernoc Web Page, 2004-2009.
Enerwise Website, 1999-2009.
Honeywell Programmable Thermostat Owner's Guide, www.honeywell.com/yourhome, 2004.
Honeywell, W7600/W7620 Controller Reference Manual, HW0021207, Oct. 1992.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.
Lin, et al., "Multi-Sensor Single-Actuator Control of HVAC Systems", 2002.
Pier, Southern California Edison, Demand Responsive Control of Air Conditioning via Programmable Communicating Thermostats Draft Report, Feb. 14, 2006.
Proliphix Thermostat Brochure, prior to Jun. 2007.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for non-smooth simulation-based optimization, Building and Environment 39, 2004, pp. 989-999.
U.S. Appl. No. 14/263,762, filed Apr. 28, 2014, Steinberg.
Bourhan, et al., "Dynamic model of an HVAC system for control analysis", Elsevier 2004.
Brush, et al., Preheat—Controlling Home Heating with Occupancy Prediction, 2013.
Emerson Climate Technologies, "Network Thermostat for E2 Building Controller Installation and Operation Manual", 2007.
Gupta, Adding GPS-Control to Traditional Thermostats: An Exploration of Potential Energy Savings and Design Challenges, MIT, 2009.
Gupta, et al., A Persuasive GPS-Controlled Thermostat System, MIT, 2008.
Johnson Controls, "T600HCx-3 Single-Stage Thermostats", 2006.
Krumm, et al., Learning Time-Based Presence Probabilities, Jun. 2011.
Raji, "Smart Networks for Control", IEEE Spectrum, Jun. 1994.
Scott, et al., Home Heating Using GPS-Based Arrival Prediction, 2010.
International Search Report and Written Opinion for PCT/US2013/035726, dated Aug. 6, 2013.
Written Opinion and Search Report for PCT/US2011/032537, dated Dec. 12, 2011.
International Preliminary Report on Patentability in PCT/US2013/035726 dated Dec. 16, 2014.

* cited by examiner

SYSTEM AND METHOD FOR USING RAMPED SETPOINT TEMPERATURE VARIATION WITH NETWORKED THERMOSTATS TO IMPROVE EFFICIENCY

CROSS-REFERENCE TO RELATED APPLICATIONS

This application is a continuation of U.S. patent application Ser. No. 12/498,142, filed Jul. 6, 2009, now U.S. Pat. No. 8,010,237, entitled SYSTEM AND METHOD FOR USING RAMPED SETPOINT TEMPERATURE VARIATION WITH NETWORKED THERMOSTATS TO IMPROVE EFFICIENCY, which also claims priority to U.S. Provisional Application No. 61/133,994, filed Jul. 7, 2008, the entirety of both of which are incorporated herein by reference and is to be considered part of this specification.

BACKGROUND OF THE INVENTION

1. Field of the Invention

This invention relates to the use of thermostatic HVAC controls that are connected to a computer network. More specifically, the present invention pertains to application of specific adaptive waveforms to the setpoints programmed into thermostats in order to reduce energy consumption without a subjective loss of comfort.

2. Background

Heating and cooling systems for buildings (heating, ventilation and cooling, or HVAC systems) have been controlled for decades by thermostats. At the most basic level, a thermostat includes a means to allow a user to set a desired temperature, a means to sense actual temperature, and a means to signal the heating and/or cooling devices to turn on or off in order to try to change the actual temperature to equal the desired temperature. The most basic versions of thermostats use components such as a coiled bi-metallic spring to measure actual temperature and a mercury switch that opens or completes a circuit when the spring coils or uncoils with temperature changes. More recently, electronic digital thermostats have become prevalent. These thermostats use solid-state devices such as thermistors or thermal diodes to measure temperature, and microprocessor-based circuitry to control the switch and to store and operate based upon user-determined protocols for temperature vs. time.

These programmable thermostats generally offer a very restrictive user interface, limited by the cost of the devices, the limited real estate of the small wall-mounted boxes, and the inability to take into account more than two variables: the desired temperature set by the user, and the ambient temperature sensed by the thermostat. Users can generally only set one series of commands per day, and in order to change one parameter (e.g., to change the late-night temperature) the user often has to cycle through several other parameters by repeatedly pressing one or two buttons.

Because the interface of programmable thermostats is so poor, the significant theoretical savings that are possible with them (sometimes cited as 25% of heating and cooling costs) are rarely realized. In practice, studies have found that more than 50% of users never program their thermostats at all. Significant percentages of the thermostats that are programmed are programmed sub-optimally, in part because, once programmed, people tend not to re-invest the time needed to change the settings very often.

A second problem with standard programmable thermostats is that they represent only a small evolutionary step beyond the first, purely mechanical thermostats. Like the first thermostats, they only have two input signals—ambient temperature and the preset desired temperature. The entire advance with programmable thermostats is that they can shift between multiple present temperatures at different times without real-time involvement of a human being.

Because most thermostats control HVAC systems that do not offer infinitely variable output, traditional thermostats are designed to permit the temperature as seen by the thermostat to vary above and below the setpoint to prevent the HVAC system from constantly and rapidly cycling on and off, which is inefficient and harmful to the HVAC system. The temperature range in which the thermostat allows the controlled environment to drift is known as both the dead zone and, more formally, the hysteresis zone. The hysteresis zone is frequently set at +/−1 degree Fahrenheit. Thus if the setpoint is 68 degrees, in the heating context the thermostat will allow the inside temperature to fall to 67 degrees before turning the heating system on, and will allow it to rise to 69 degrees before turning it off again.

Standard programmable thermostats are all designed with the same basic underlying premise: that the comfort of building occupants is maximized by maintaining a relatively constant temperature, at least for the duration of a given setpoint, and with the variations inherent in using a hysteresis band to trade comfort off against efficient operation and durability. That is, if a programmable thermostat has been programmed to maintain a temperature of 68 degrees Fahrenheit for 8 hours, it will cycle the HVAC system as needed to maintain that temperature.

However, academic research has shown that humans tend not to notice changes in temperature if (a) they are below a certain magnitude and (b) if the rate of change is sufficiently slow. For example a 1978 study found that people did not notice ramps less than 0.5° C./h (0.9° F./h). A 2004 study found that and that ramps up to 1.5° C./h (2.7° F./h) are unlikely to cause discomfort.

Because energy consumption is directly proportional to setpoint—that is, the further a given setpoint diverges from the balance point (the inside temperature assuming no HVAC activity) in a given house under given conditions, the higher energy consumption will be to maintain temperature at that setpoint), energy will be saved by any strategy that over a given time frame lowers the average heating setpoint or raises the cooling setpoint. It is therefore possible to save energy by adopting a strategy that takes advantage of human insensitivity to slow temperature ramping by incorporating a user's desired setpoint within the range of the ramp, but setting the average target temperature below the desired setpoint in the case of heating, and above it in the case of cooling. For example, a ramped summer setpoint that consisted of a repeated pattern of three phases of equal length set at 72° F., 73° F., and 74° F. would create an effective average setpoint of 73° F., but would generally be experienced by occupants as yielding equivalent comfort as in a room set at a constant 72° F. Energy savings resulting from this approach have been shown to be in the range of 4-6%.

It would be advantageous to create a temperature control system that would automatically generate optimized ramped setpoints that could save energy without compromising the comfort of the occupants. It would also be advantageous to create a temperature control system that could incorporate adaptive algorithms that could automatically determine when the ramped setpoints should not be applied due to a variety of exogenous conditions that make application of such ramped setpoints undesirable.

SUMMARY OF THE INVENTION

In one embodiment, the invention comprises a thermostat attached to an HVAC system, a local network connecting the thermostat to a larger network such as the Internet, and one or more additional thermostats attached to the network, and a server in bi-directional communication with a plurality of such thermostats. The server logs the ambient temperature sensed by each thermostat vs. time and the signals sent by the thermostats to their HVAC systems. The server preferably also logs outside temperature and humidity data for the geographic locations for the buildings served by the connected HVAC systems. Such information is widely available from various sources that publish detailed weather information based on geographic areas such as by ZIP code. The server uses this data to determine optimum application of an n-phase ramped setpoint algorithm in order to change the actual average setpoint over time without affecting the perceived temperature.

At least one embodiment of the invention comprises the steps of measuring the temperature inside a conditioned space; comparing said inside temperature to the desired setpoint for such conditioned space; evaluating the schedule for setpoint changes; determining whether the scheduled setpoint has been changed; setting the actual setpoint to the desired setpoint; determining the number of phases for actual setpoints; setting actual setpoints to increments away from the desired setpoint as additional phases, where each successive setpoint is further from said desired setpoint than the previous setpoint; and returning to the desired setpoint after said determined number of setpoints has been reached.

At least one embodiment of the invention comprises the steps of evaluating the temperature inside a conditioned environment; evaluating weather conditions outside the conditioned environment; setting a first target inside temperature for a specified time interval; setting at least a second target inside temperature for a specified time interval, where said second target temperature differs from said first target temperature by a specified amount; determining whether said variation of temperature setpoints is appropriate given said outside weather conditions; and cycling through said two or more target temperatures.

DETAILED DESCRIPTION OF THE PREFERRED EMBODIMENT

Figure 1:
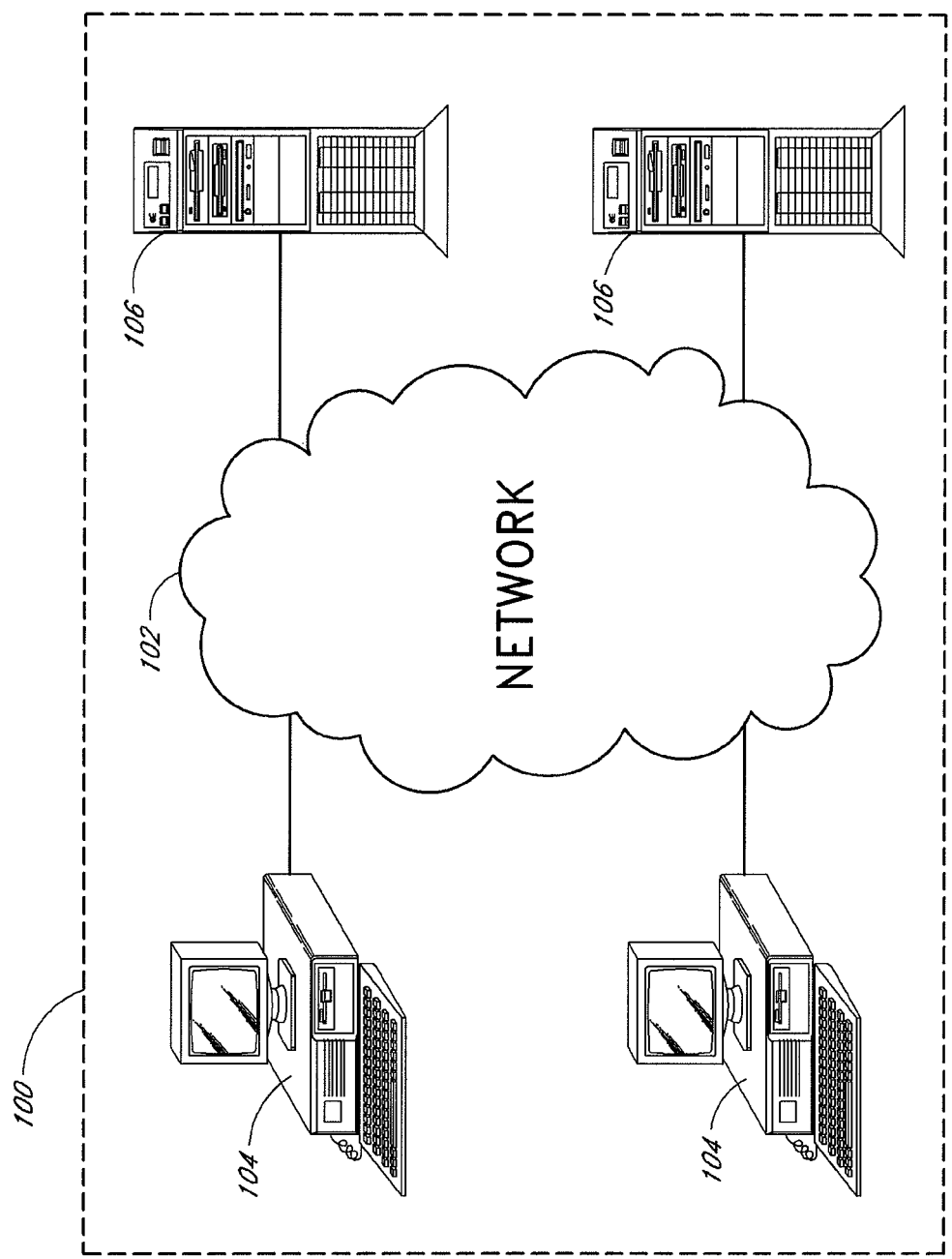
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

When a user of the subject invention wishes to access information on network 102, the buyer initiates connection from his computer 104. For example, the user invokes a browser, which executes on computer 104. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video. Servers 106 also provide a variety of services other than serving websites. These services, such as communicating with and controlling remote devices as described below, may be delivered via Internet Protocol or other means for communicating across a network.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
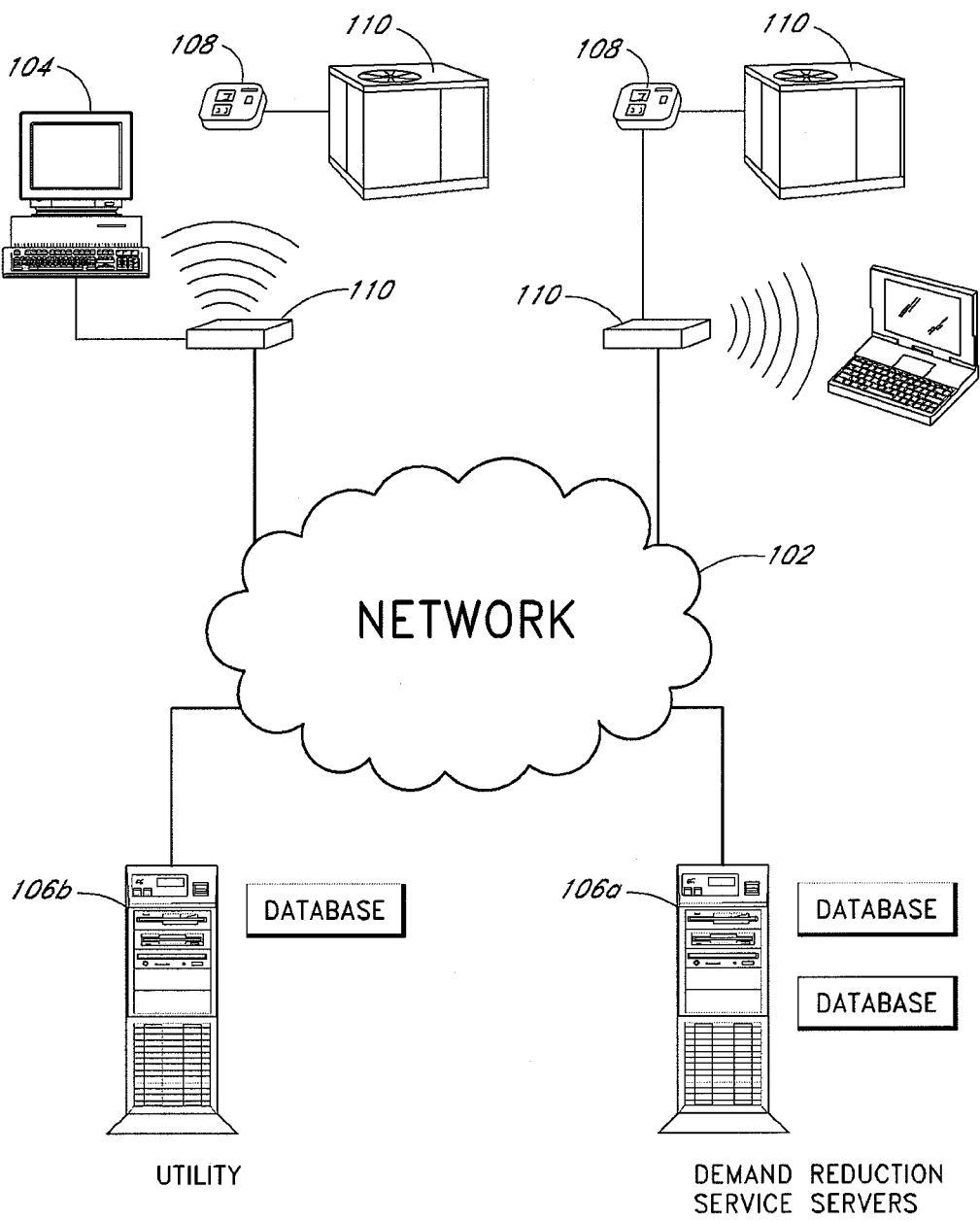
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the server 106 via wired or wireless connection such as Ethernet or a wireless protocol such as IEEE 802.11, a gateway 110 that connects the computer and thermostat to the Internet via a broadband connection such as a digital subscriber line (DSL) or other form of broadband connection to the World Wide Web. Server 106 contains the content to be served as web pages and viewed by computers 104, as well as databases containing information used by the servers.

Figure 3:
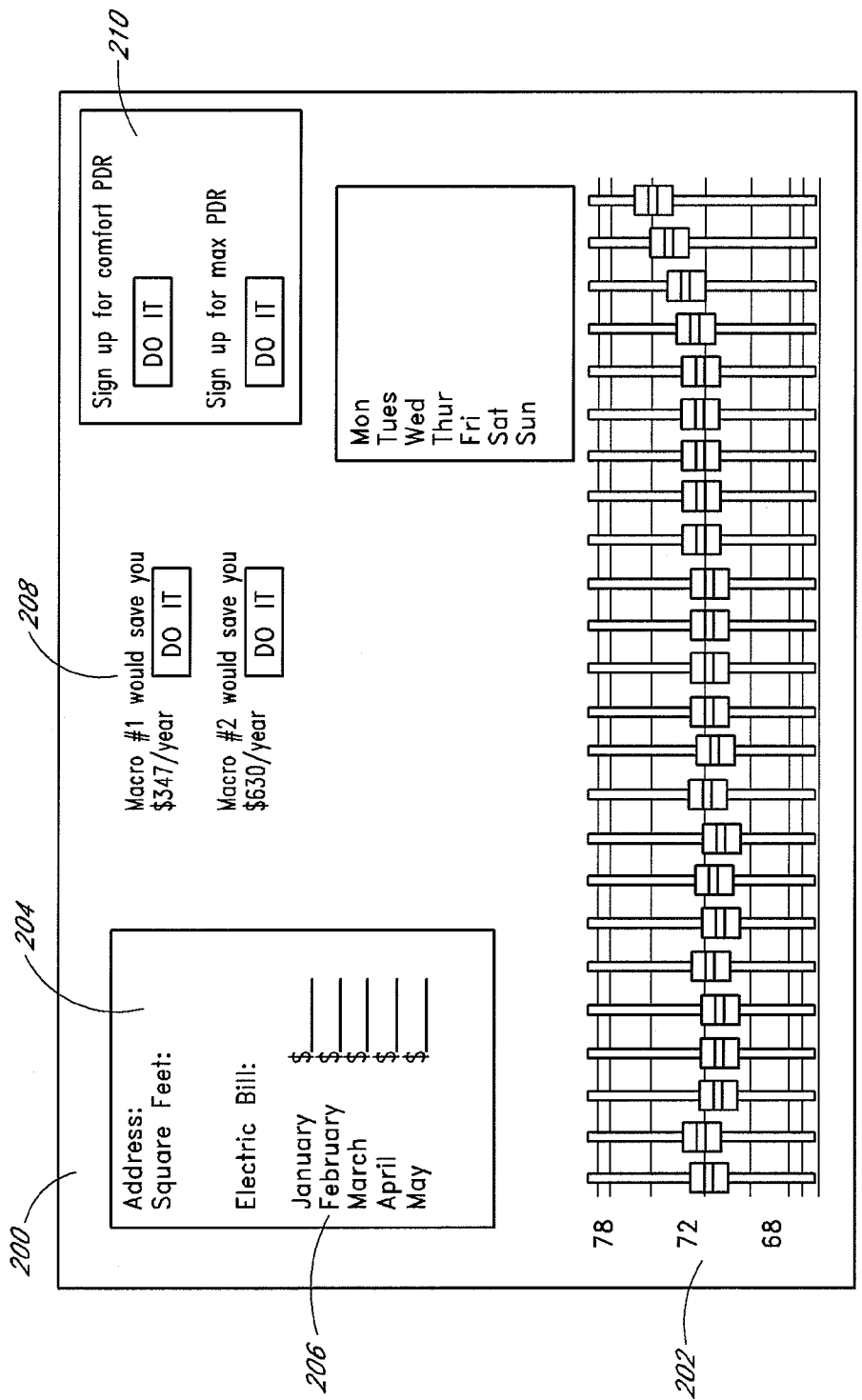
FIG. 3 shows an embodiment of the website to be used as part of the subject invention.

In the currently preferred embodiment, the website 200 includes a number of components accessible to the user, as shown in FIG. 3. Those components may include a means to enter temperature settings 202, a means to enter information about the user's home 204, a means to enter the user's electricity bills 206, means to calculate energy savings that could result from various thermostat-setting strategies 208, and means to enable and choose between various arrangements 210 for demand reduction with their electric utility provider as intermediated by the demand reduction service provider.

Figure 4:
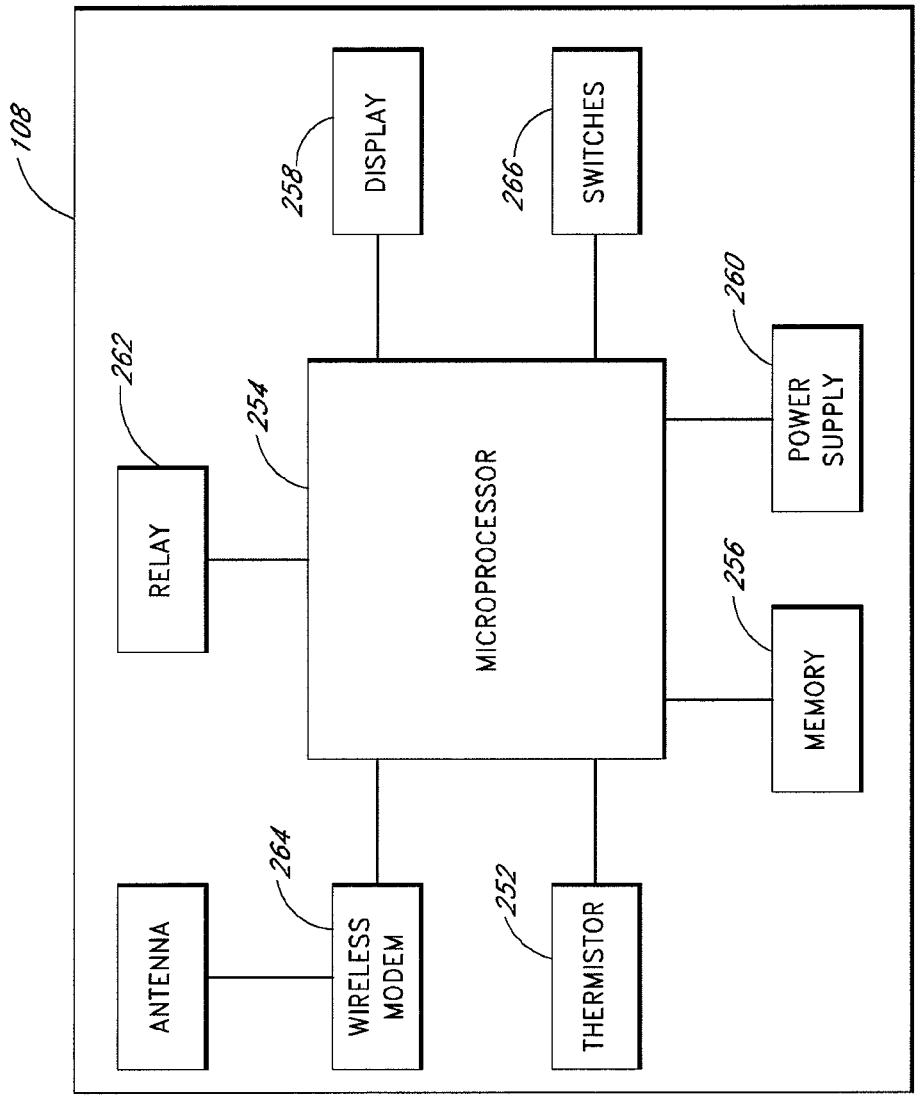
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, a relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or a wireless network. Such means could be in the form of Ethernet, wireless protocols such as IEEE 802.11, IEEE 802.15.4, Bluetooth, cellular systems such as CDMA, GSM and GPRS, or other wireless protocols. The thermostat 250 may also include controls 266 allowing users to change settings directly at the thermostat, but such controls are not necessary to allow the thermostat to function.

Figure 5:
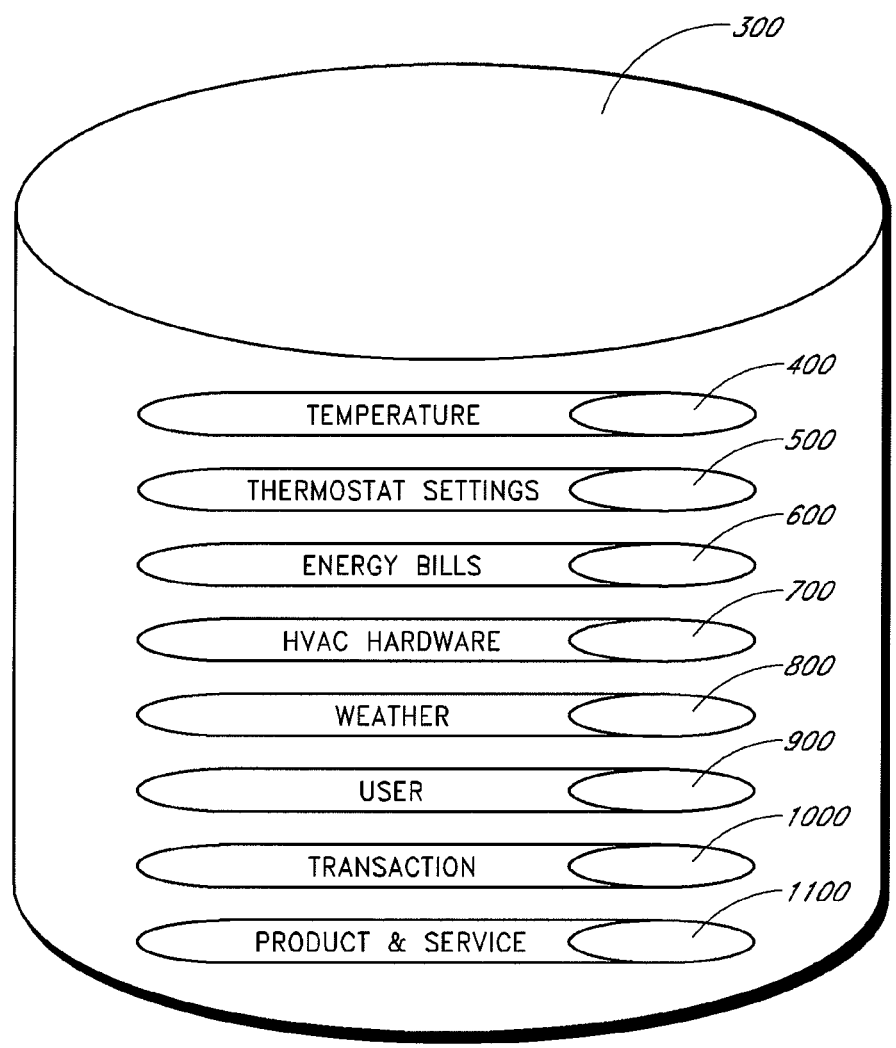
FIG. 5 shows one embodiment of the database structure used as part of the subject invention

The data used to generate the content delivered in the form of the website is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website 200 will allow users of connected thermostats 250 to create personal accounts. Each user's account will store information in database 900, which tracks various attributes relative to users of the site. Such attributes may include the make and model of the specific HVAC equipment in the user's home; the age and square footage of the home, the solar orientation of the home, the location of the thermostat in the home, the user's preferred temperature settings, whether the user is a participant in a demand reduction program, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

The system installed in a subscriber's home may optionally include additional temperature sensors at different locations within the building. These additional sensors may be connected to the rest of the system via a wireless system such as 802.11 or 802.15.4, or may be connected via wires. Additional temperature and/or humidity sensors may allow increased accuracy of the system, which can in turn increase user comfort or energy savings.

Figure 6:
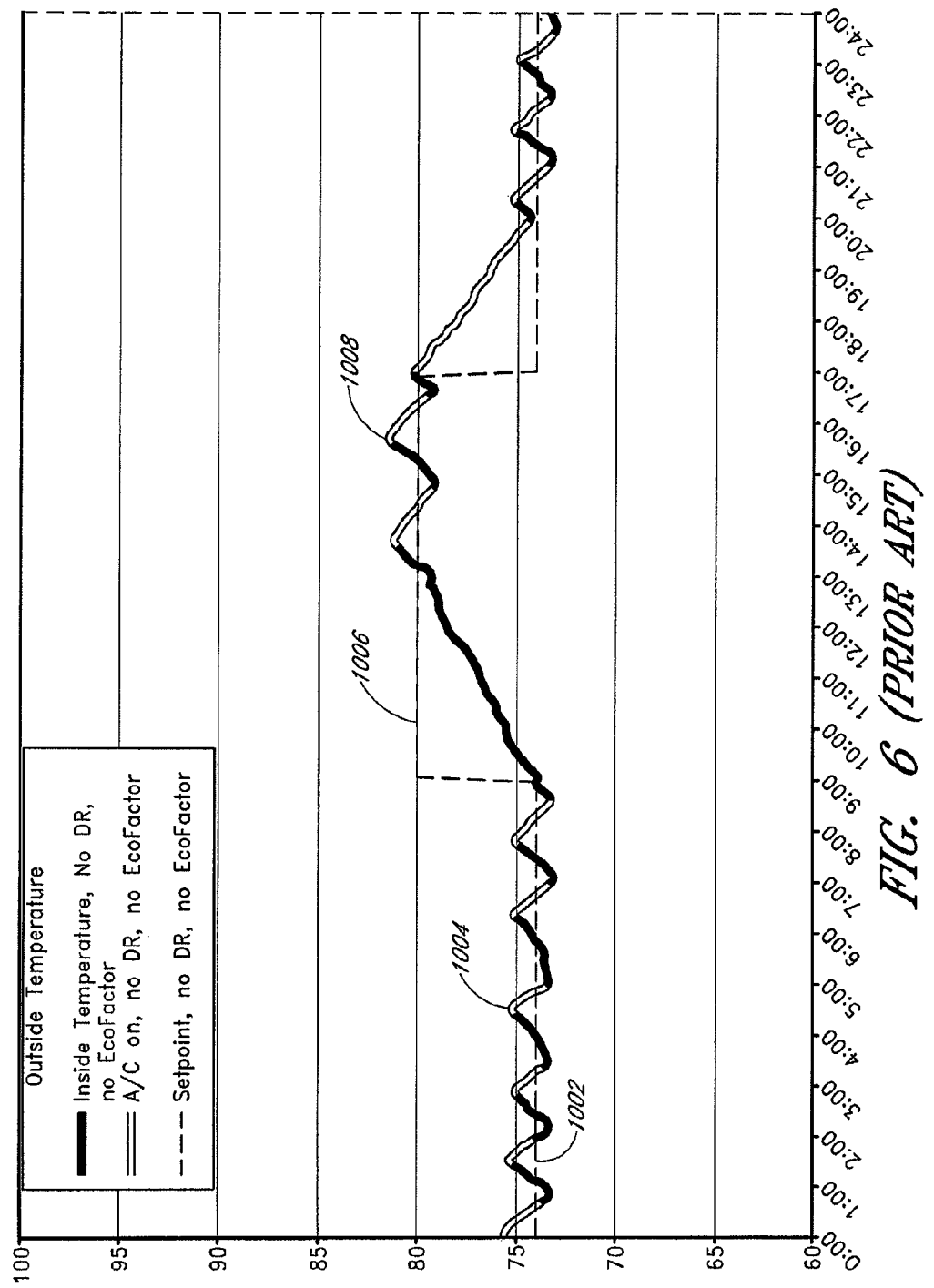
FIG. 6 shows the conventional programming of a programmable thermostat over a 24-hour period.

FIG. 6 represents the conventional programming of a thermostat and the resulting behavior of a home's HVAC system in the air conditioning context. The morning setpoint of 74 degrees 1002 remains constant from midnight until 9:00 AM, and the inside temperature 1004 varies more or less within the limits of the hysteresis band during that entire period. When the setpoint changes to 80 degrees 1006, the inside temperature 1008 varies within the hysteresis band around the new setpoint, and so on. Whether the average temperature is equal to, greater or less than the nominal setpoint will depend on weather conditions, the dynamic signature of the structure, and the efficiency and size of the HVAC system. But in most cases the average temperature will be at least roughly equivalent to the nominal setpoint.

Figure 7:
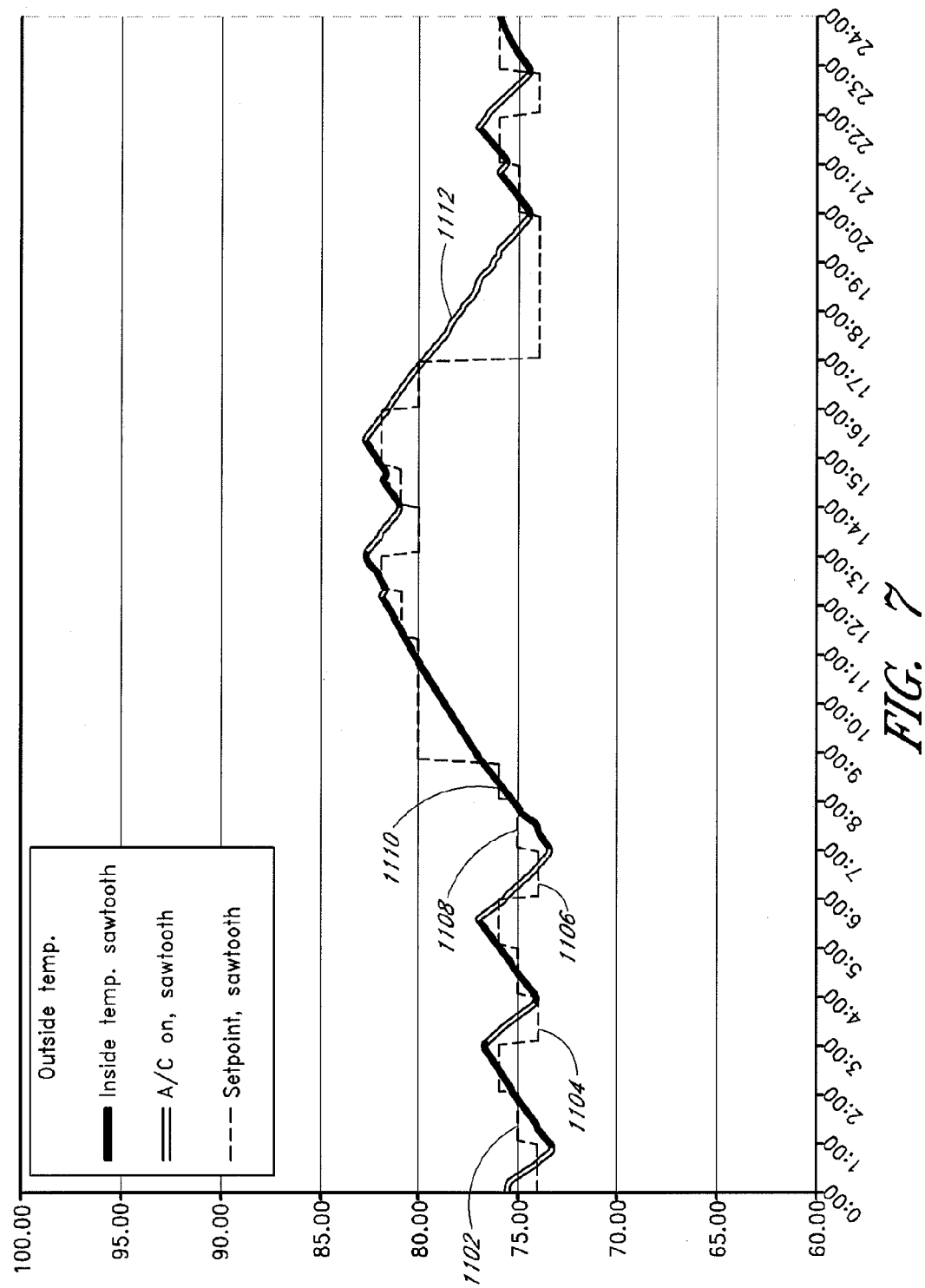
FIG. 7 shows the programming of a programmable thermostat over a 24-hour period using ramped setpoints.

FIG. 7 represents implementation of three-phase ramped setpoint 1102 derived from the same user preferences as manifested by the settings shown in FIG. 6. Because 74 degrees, the setpoint requested by the user 1104 is the lowest of the three discrete steps 1106, 1108, 1110, rather than the middle step, the average inside temperature 1112 will be roughly one degree warmer than the average temperature without use of the ramped setpoints.

In order to implement such ramped setpoints automatically, algorithms may be created. These algorithms may be generated on remote server 106 and the setpoint changes can be transmitted to a given thermostat on a just-in-time basis or, if the thermostat 108 is capable of storing future settings, they may be transferred in batch mode to such thermostats. Basic parameters used to generate such algorithms include:

the number of discrete phases to be used;
the temperature differential associated with each phase; and
the duration of each phase In order to increase user comfort and thus maximize consumer acceptance, additional parameters may be considered, including:
- time of day
- outside weather conditions
- recent history of manual inputs
- recent pre-programmed setpoint changes.

Time of day may be relevant because, for example, if the home is typically unoccupied at a given time, there is no need for perceptual programming. Outside weather is relevant because comfort is dependent not just on temperature as sensed by a thermostat, but also includes radiant differentials. On extremely cold days, even if the inside dry-bulb temperature is within normal comfort range, radiant losses due to cold surfaces such as single-glazed windows can cause subjective discomfort; thus on such days occupants may be more sensitive to ramping. Recent manual inputs (e.g., programming overrides) may create situations in which exceptions should be taken; depending on the context, recent manual inputs may either suspend the ramping of setpoints or simply alter the baseline temperature from which the ramping takes place.

Figure 8:
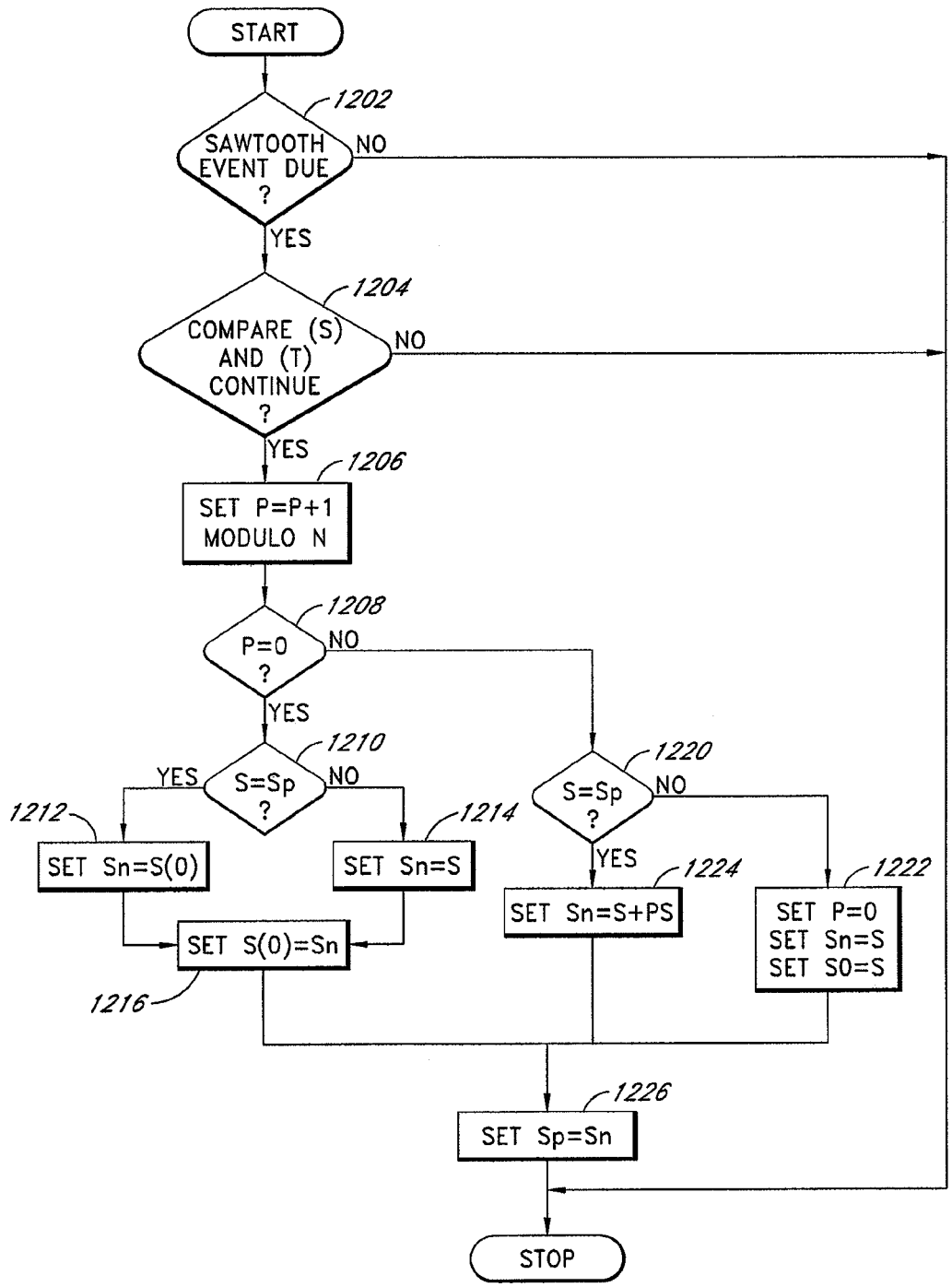
FIG. 8 shows the steps required for the core function of the ramped setpoint algorithm.

FIG. 8 shows the steps used in the core ramped setpoint algorithm into the context of a remotely managed thermostat system. In step 1202 the application determines whether to instantiate the algorithm based upon external scheduling criteria. In step 1204 the application running on a remote server retrieves from the thermostat the data generated by or entered into the thermostat, including current temperature settings, HVAC status and inside temperature. The algorithm performs preliminary logical tests at that point to determine whether further processing is required. For example, in the heating context, if the inside temperature as reported by the thermostat 108 is more than 1 degree higher than the current setpoint, the algorithm may determine that running the ramped setpoint program will have no effect and therefore terminate. In step 1206 the algorithm advances to the next phase from the most recent phase; i.e., if the algorithm is just starting, the phase changes from "0" to "1"; if it has just completed the third phase of a three-phase ramp, the phase will change from "2" to "0". In step 1208 the application determines if the current phase is "0". If it is, then in step 1210 the algorithm determines whether current setpoint equals the setpoint in the previous phase. If so, which implies no manual overrides or other setpoint adjustments have occurred during the most recent phase, then in step 1212 the algorithm sets the new setpoint back to the previous phase "0" setpoint. If not, then in step 1214, the algorithm keeps the current temperature setting as setpoint for this new phase. In step 1216, the algorithm logs the resulting new setpoint as the new phase "0" setpoint for use in subsequent phases.

Returning to the branch after step 1208, if the current phase at that point is not phase "0", then in step 1220, the algorithm determines whether the current setpoint is equal to the setpoint temperature in the previous phase. If not, which implies setpoints have been adjusted by the house occupants, thermostat schedules, or other events, then in step 1222, the application resets the phase to "0", resets the new setpoint associated with phase "0" to equal the current temperature setting, and sets the current setting to that temperature. Alternatively, if the current temperature setting as determined in step 1220 is equal to the setpoint in the previous phase, then in step 1224 new setpoint is made to equal current setpoint plus the differential associated with each phase change. In step 1226 the "previous-phase setpoint" variable is reset to equal the new setpoint in anticipation of its use during a subsequent iteration.

Figure 9:
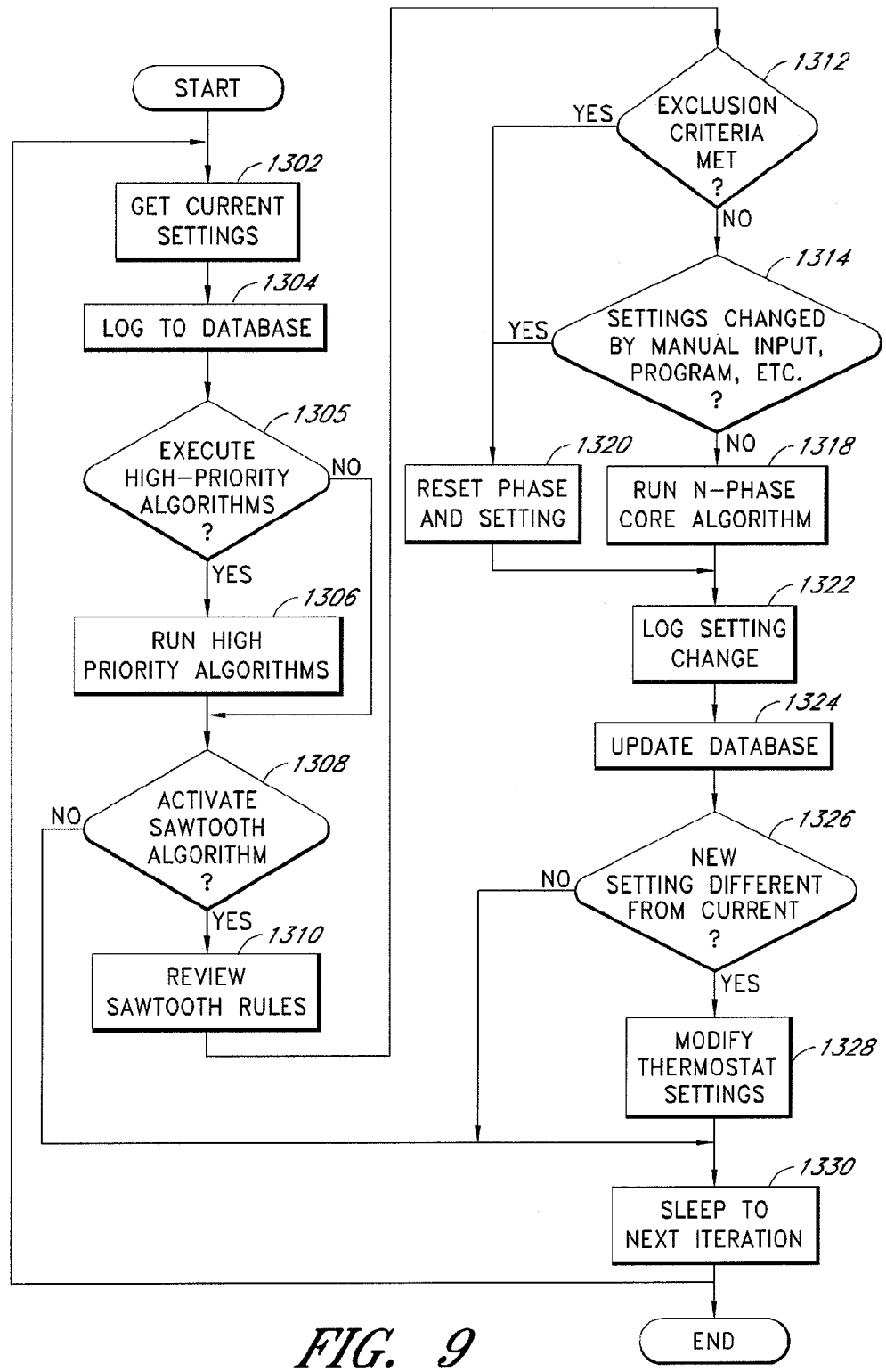
FIG. 9 shows a flowchart listing steps in the process of deciding whether to implement the ramped setpoint algorithm.

FIG. 9 shows one embodiment of the overall control application implementing the algorithm described in FIG. 8. In step 1302, the control application retrieves the current setting from the thermostat. In step 1304, the setting is logged in database 300. In step 1305, the control program determines whether other algorithms that have higher precedence than the ramped setpoint algorithm are to be run. If another algorithm is to be run prior to the ramped setpoint algorithm, then the other program is executed in step 1306. If there are no alternate algorithms that should precede the ramped setpoint application then in step 1308, the control program determines whether the thermostat has been assigned to execute the ramped setpoint program. If not, the control program skips the remaining actions in the current iteration. If the program is set to run, then in step 1310 the algorithm retrieves from database 300 the rules and parameters governing the implementation of the algorithm for the current application of the program. In step 1312, the algorithm determines whether one or more conditions that preclude application of the algorithm, such as extreme outside weather conditions, whether the home is likely to be occupied, etc. If any of the exclusionary conditions apply, the application skips execution of the ramped setpoint algorithm for the current iteration. If not, the application proceeds to step 1314 in which the application determines whether the setpoint has been altered by manual overrides, thermostat setback schedule changes, or other algorithms as compared to the previous value as stored in database 300. If setpoint has been altered, the application proceeds to step 1320 discussed below. In step 1318, the program described in FIG. 8, is executed. In step 1320, the application resets the phase to "0". Certain temperature setting variables are reset in anticipation of their use in subsequent phases. These variables include the new phase 0 temperature setting which is anchored to the current actual temperature setting, and the new previous-phase setpoint which will be used for identifying setpoint overrides in the subsequent phase.

In step 1322, the system records the changes to the thermostat settings to database 300. In step 1324, the system records the changes to the phase status of the algorithm to database 300. In step 1326, the application determines whether the new temperature setting differs from the current setting. If they are the same, the application skips applying changes to the thermostat. If they are different, then in step 1328, the application transmits revised settings to the thermostat. In step 1330, the application then hibernates for the specified duration until it is invoked again by beginning at step 1302 again.

What is claimed is:

1. A method for controlling a thermostat for energy savings comprising:
    determining an existing setpoint;
    automatically setting a first setpoint of a repeating sequence of discrete setpoints to the value of the existing setpoint;
    determining a number of discrete setpoints in the repeating sequence of discrete setpoints, wherein the repeating sequence of discrete setpoints is logged to a database;
    automatically setting subsequent setpoints in the repeating sequence of discrete setpoints to increments away from the first setpoint, where each successive setpoint is further from said first setpoint;
    returning to the first setpoint after completing a last setpoint in said repeating sequence of discrete setpoints; and
    returning directly to the first setpoint in the event a manual input is detected.

2. A method as in claim 1 wherein said repeating sequence of discrete setpoints comprises three setpoints.

3. A method as in claim 1 in which said repeating sequence of discrete setpoints are determined by a remote computer.

4. A method as in claim 1 in which said increments in said repeating sequence of discrete setpoints vary by one degree Fahrenheit.

5. A method as in claim 1 further comprising varying inside temperature between three or more setpoints, and each of said subsequent setpoints is higher than said first setpoint.

6. A method as in claim 1 wherein each of said subsequent setpoints is a higher temperature than said first setpoint.

7. A method as in claim 1 wherein each of said subsequent setpoints after the first setpoint is a lower temperature than said first setpoint.

8. A method as in claim 1 further comprising varying wherein each subsequent setpoint after the first setpoint is a lower temperature than said first setpoint, and returning to said first setpoint after reaching last setpoint of said repeating sequence of discrete setpoints.

9. A method for controlling a thermostat for energy savings comprising:
   determining an existing setpoint;
   automatically setting a first setpoint of a repeating sequence of discrete setpoints to the value of the existing setpoint;
   determining a number of discrete setpoints in the repeating sequence of discrete setpoints;
   automatically setting subsequent setpoints in the repeating sequence of discrete setpoints to increments away from the first setpoint, where each successive setpoint is further from said first setpoint;
   returning to the first setpoint after completing a last setpoint in said repeating sequence of discrete setpoints; and
   returning to a first target temperature in response to an override by an occupant.

10. A system for automatically varying temperature setpoints for an HVAC system comprising:
   one or more computers that set a first setpoint of a target inside temperature for a conditioned environment;
   the one or more computers set at least a second setpoint of a target inside temperature for the conditioned environment, where said second target temperature differs from said first target temperature wherein at least said first and second setpoints are logged to a database;
   the one or more computers automatically set subsequent setpoints in the repeating sequence of discrete setpoints to increments away from the first setpoint, where each successive setpoint is further from said first setpoint;
   the one or more computers cycle through said repeating sequence of discrete setpoints; and
   the one or more computers return directly to the first setpoint in the event a manual input is detected.

11. A system as in claim 10 further comprising a third setpoint and said system varies the inside temperature between said first, second and third setpoints.

12. A system as in claim 10 in which at least said second setpoint is initiated by a remote computer.

13. A system as in claim 10 in which said first and second setpoints vary by one degree Fahrenheit.

14. A system as in claim 10 in which the one or more computers vary the inside temperature between a repeating sequence of three or more setpoints, and each setpoint after the first setpoint is higher than said first setpoint.

15. A system as in claim 10 in which the one or more computers vary the inside temperature between a repeating sequence of three or more setpoints, and each setpoint after the first setpoint is higher than said first setpoint, and said system returns to said first setpoint after reaching the last of said three or more setpoints.

16. A system as in claim 10 in which the one or more computers vary the inside temperature between a repeating sequence of three or more setpoints, and each setpoint after the first setpoint is lower than said first setpoint.

17. A system as in claim 10 in which the one or more computers vary the inside temperature between a repeating sequence of three or more setpoints, and each setpoint after the first setpoint is lower than said first setpoint, and said system returns to said first setpoint after reaching the last of said three or more setpoints.

* * * * *